United States Patent [19]

Rogg

[11] 4,098,402

[45] Jul. 4, 1978

[54] MODULAR TYPE CARTRIDGE STORAGE

[76] Inventor: Roger W. Rogg, Box 490, Hutchinson, Kans. 67501

[21] Appl. No.: 652,971

[22] Filed: Mar. 15, 1976

[51] Int. Cl.$^2$ .................................... B65D 85/672
[52] U.S. Cl. ............................................... 206/387
[58] Field of Search .............. 206/387; 220/23.4; 312/107

[56] References Cited

U.S. PATENT DOCUMENTS

| | | | |
|---|---|---|---|
| 3,635,350 | 1/1972 | Wolf | 206/387 |
| 3,642,337 | 2/1972 | Manheim | 206/387 |
| 3,760,937 | 9/1973 | Van Wyngarden et al. | 206/387 |
| 3,812,960 | 5/1974 | Falletta et al. | 206/387 |
| 3,889,817 | 6/1975 | Berkman | 206/387 |
| 3,909,088 | 9/1975 | Dennehey et al. | 206/387 |

FOREIGN PATENT DOCUMENTS

| | | | |
|---|---|---|---|
| 756,905 | 4/1967 | Canada | 206/387 |
| 2,418,194 | 10/1975 | Fed. Rep. of Germany | 206/387 |

*Primary Examiner*—William Price
*Attorney, Agent, or Firm*—Gregory J. Nelson

[57] ABSTRACT

The present invention relates to an interlocking modular system of containers and accessories that can be joined into various accumulations of substantially dust free containers for easy viewing, storage, and transportation of 8-track tape cartridges.

6 Claims, 16 Drawing Figures

MODULAR TYPE CARTRIDGE STORAGE

The present invention relates to an interlocking modular system of containers and accessories that can be joined into various accumulations of substantially dust free containers for easy viewing, storage, and transportation of eight-track tape cartridges.

The objective of this invention is to provide a system capable of interlocking substantially dust-free containers into various ordered arrangements for the storage, display, and transportation of eight-track tapes. In accordance with the invention, this objective is attained through the utilization of a container with a modular tongue and groove slidable connection and a modular clear plastic cap. The cap snaps securely onto the modular container which is dimensioned to contain an eight-track tape cartridge. Each face of each modular container is provided with the attaching means. The attaching means of one face is a tongue section comprised of a length of cylinder molded to an equal length of rectangle, heretofore referred to as the male section, with the attaching means of the opposite face, heretofore referred to as a female section being dimensioned for a slidable union. Both sides of the modular container wields a semi-cylindrical projection for the securing of the plastic cap.

Another objective is to provide two carrying units for the transportation of a collection of the assembled containers. One carrying unit is to provide a handle which is permanently extended and employs the use of the same slidable connections to correspond with the connections of the modular cases. The other carrying unit provides a retractable handle allowing for easy storage in drawers or on shelves and ease in transportation, again employing the use of the slidable connections.

Another objective is to provide a carrousel base for use with a variable number of containers. The carrousel is further capable of interchanging handle shafts to allow for a greater assemblage of modular containers. The carrousel swivels on a ball-bearing supported base for easy viewing. The base contains four sets of slidable connections to correspond with the connections on the containers.

Yet another objective of the invention is to provide stability for multiple stacks of modular containers through the use of a stabalizing connector strap. This again employs the slidable connections compatible to the modular containers.

In the accompanying drawings, there is shown a progressive embodiment of the invention illustrative of these and other of its objectives, novel features, and advantages.

Figure 7:
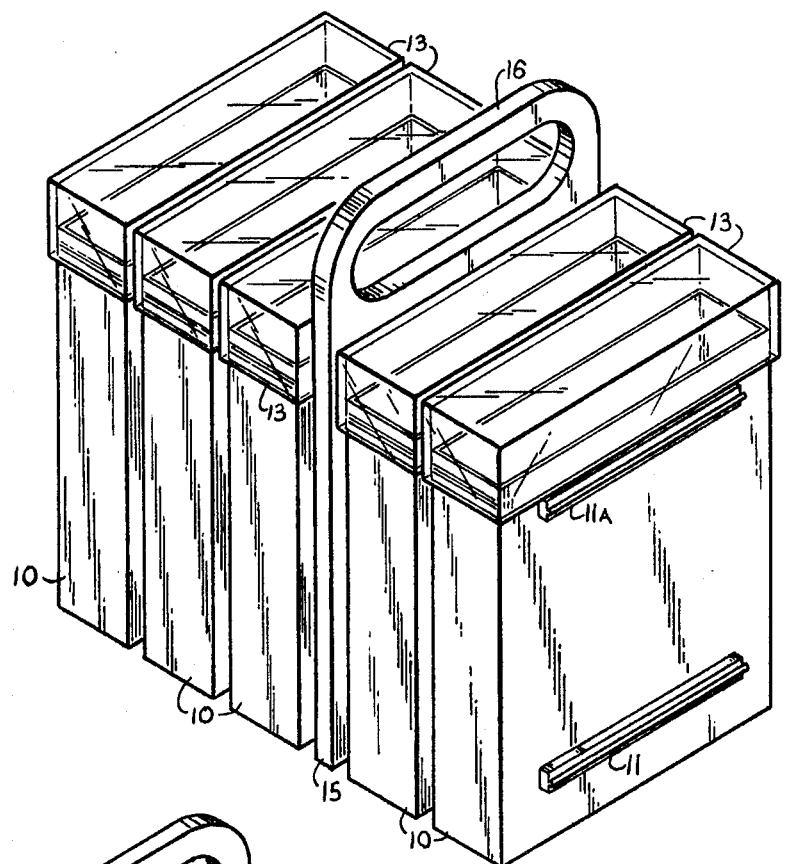
Figure 6:
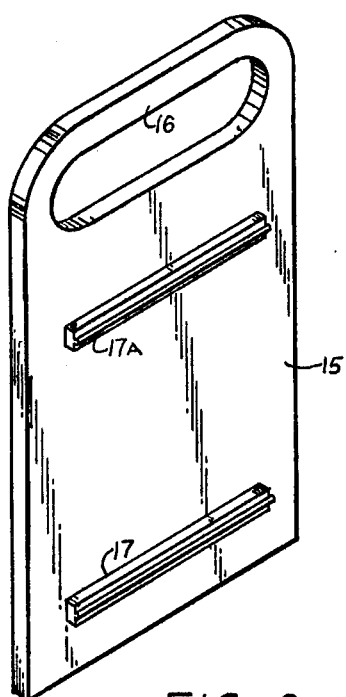
Figure 8:
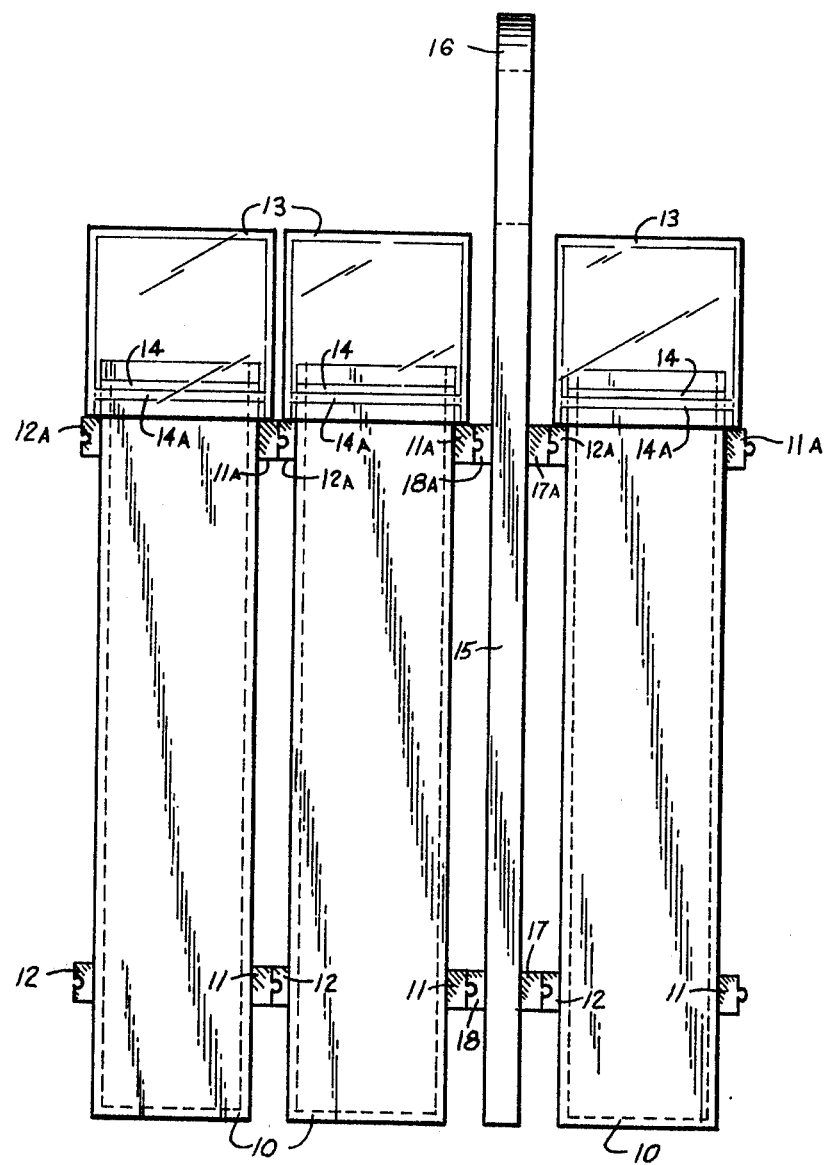
Figure 10:
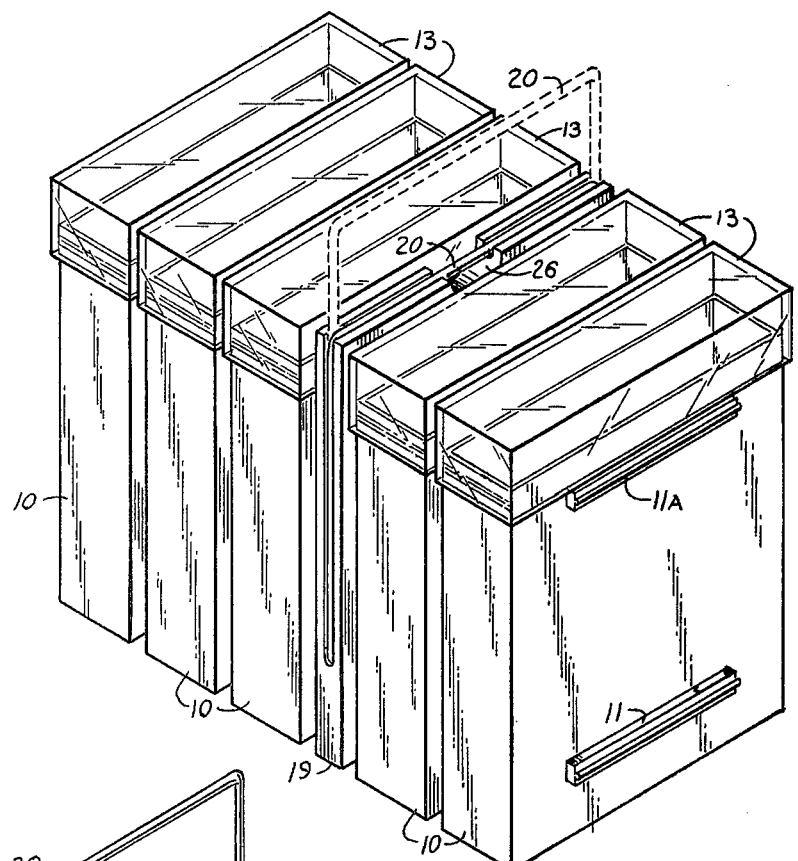
Figure 9:
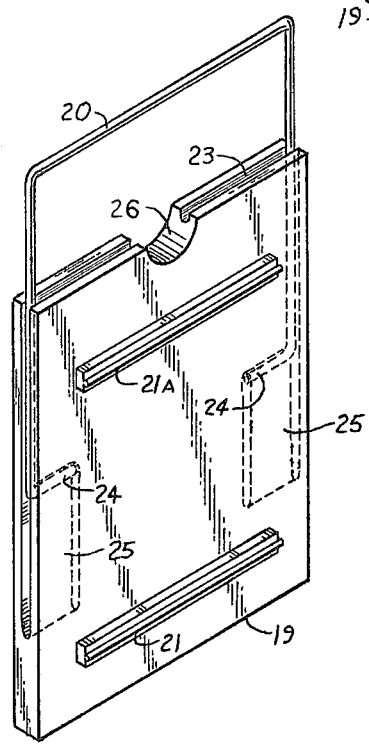
Figure 11:
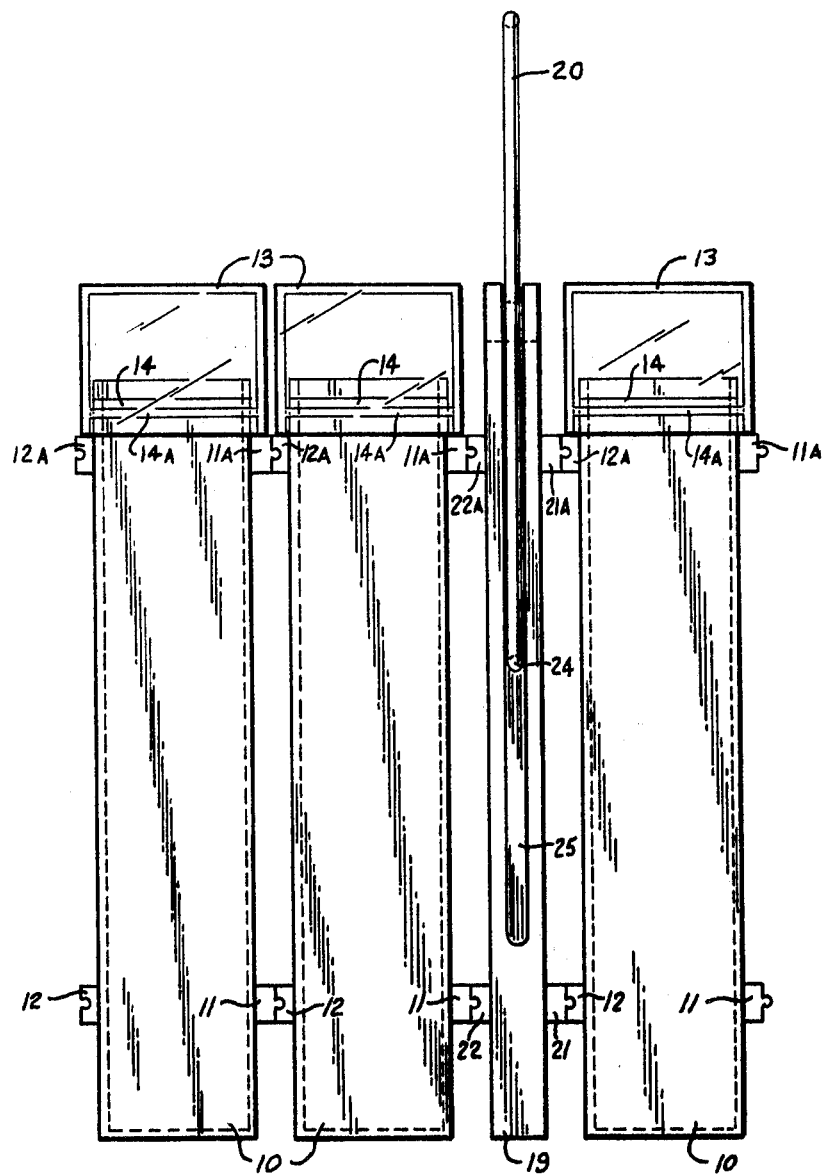
Figure 12:
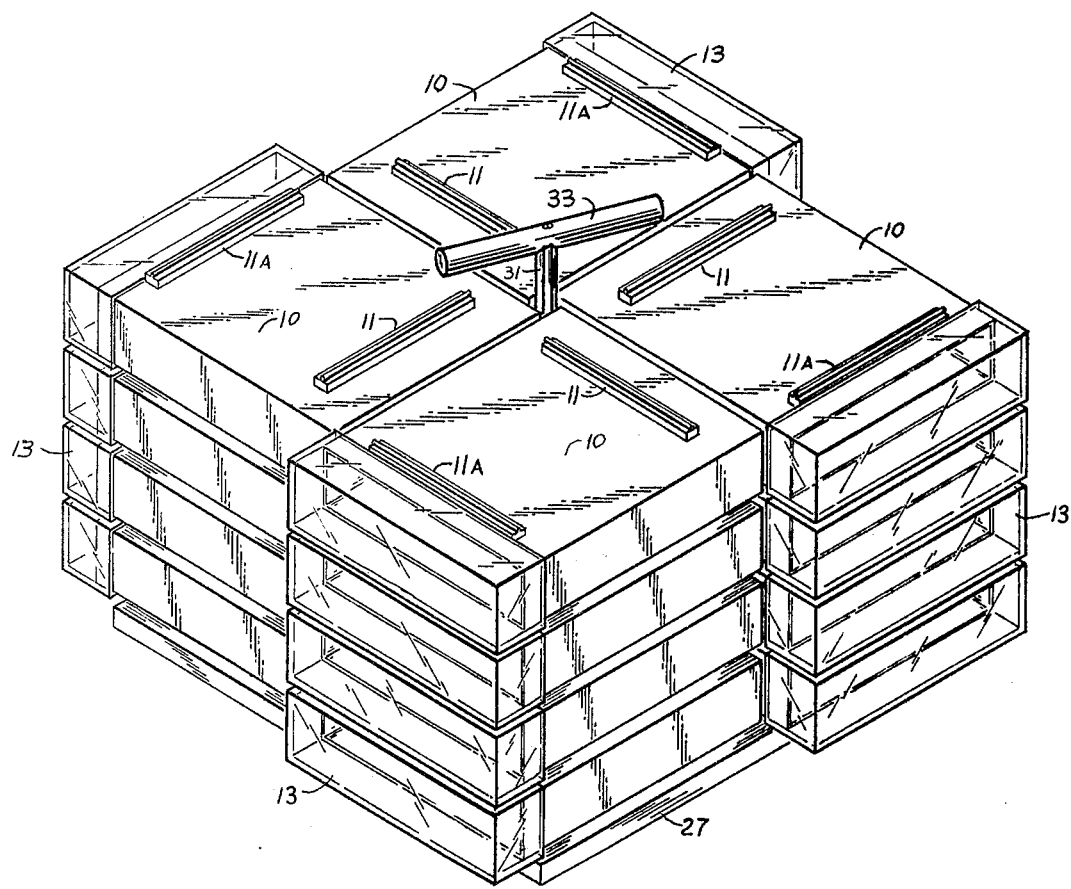
Figure 13:
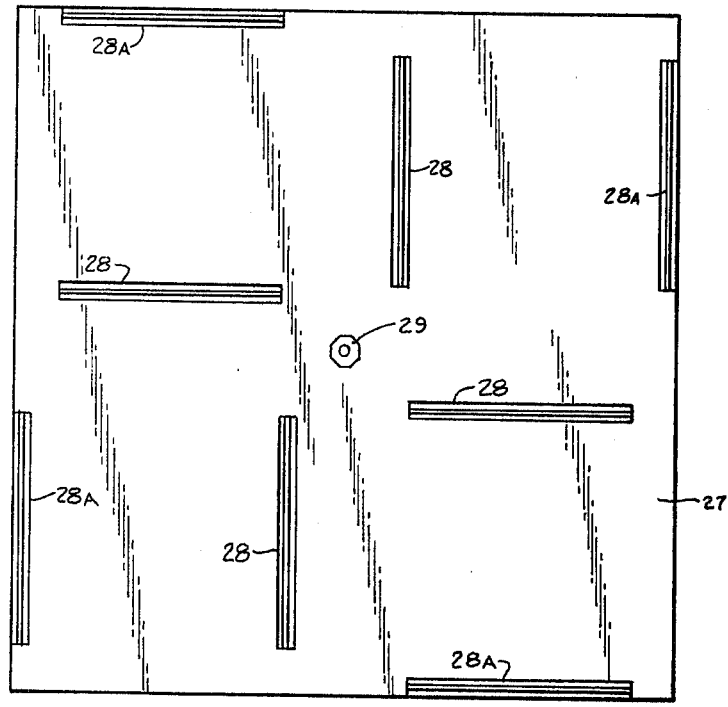
Figure 14:
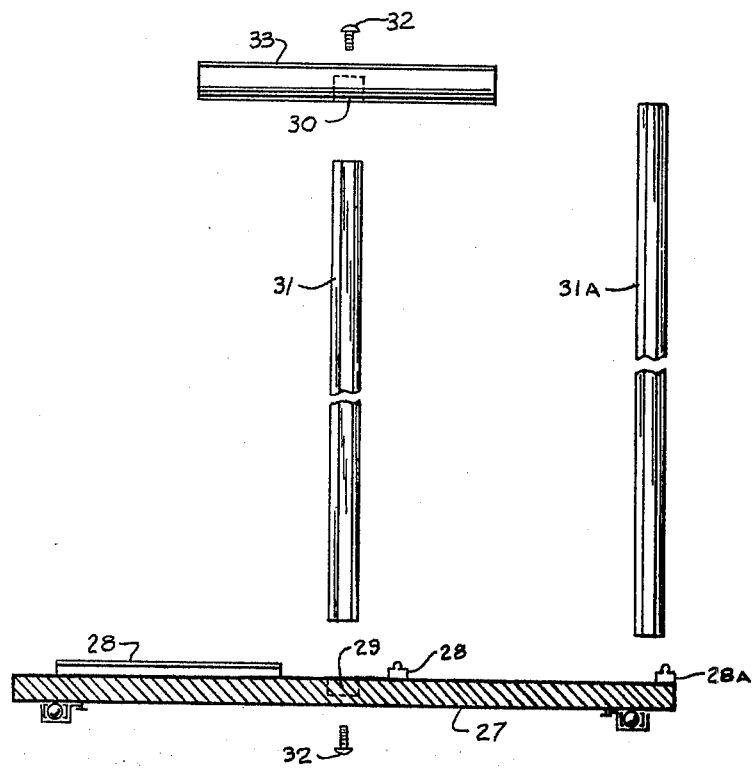
Figure 16:
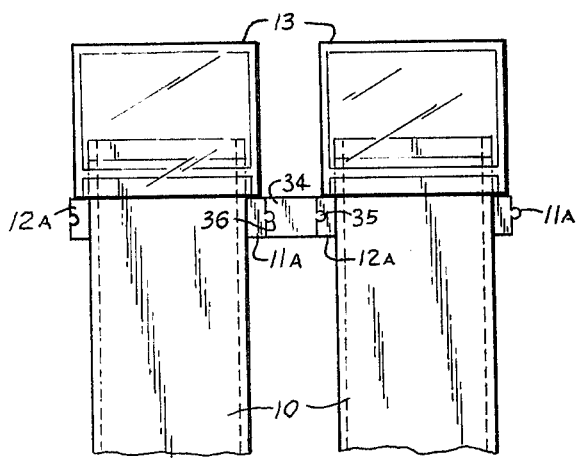
Figure 15:
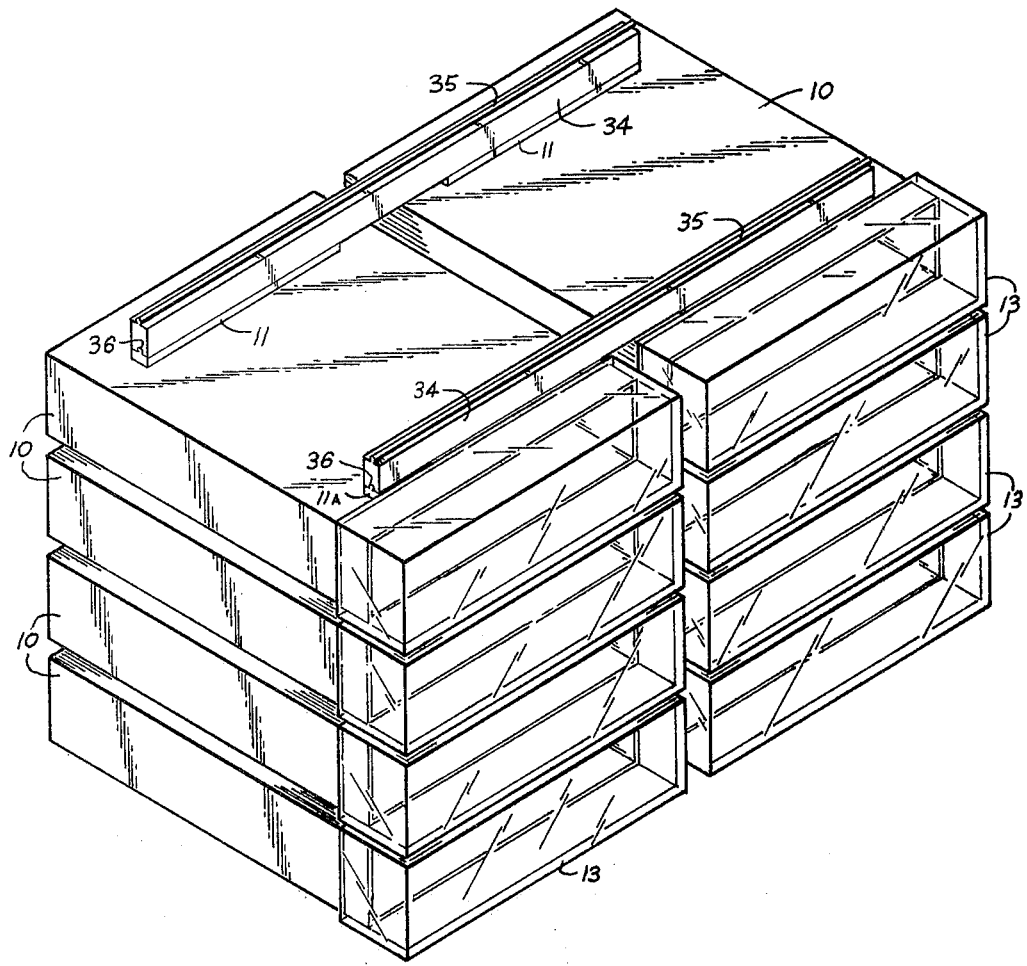

FIG. 6 is a side veiw of the container with lid delineating the relationship between the two, FIG. 7 is a detail of the locking relationship between the lid and container, FIG. 8 is an isometric of the simple handle carrying unit, FIG. 9 is an isometric view of a simple handle carrying unit assembled with containers, FIG. 10 is a side view delineating the assembly of the simple handle unit with containers, FIG. 11 is a side view of a retractable handle unit with containers, FIG. 12 is an isometric relating the modular container and lid to a carrousel base unit, FIG. 13 is a plan view of the carrousel base unit, FIG. 14 is a side view of the carrousel base unit with interchangeable handle, FIG. 15 is an isometric relating the same modular container and lid to a multible stacking ability with stabilizer straps, FIG. 16 is a side view of the stabilizer strap and its relationship to the containers and lids.

Figure 1:
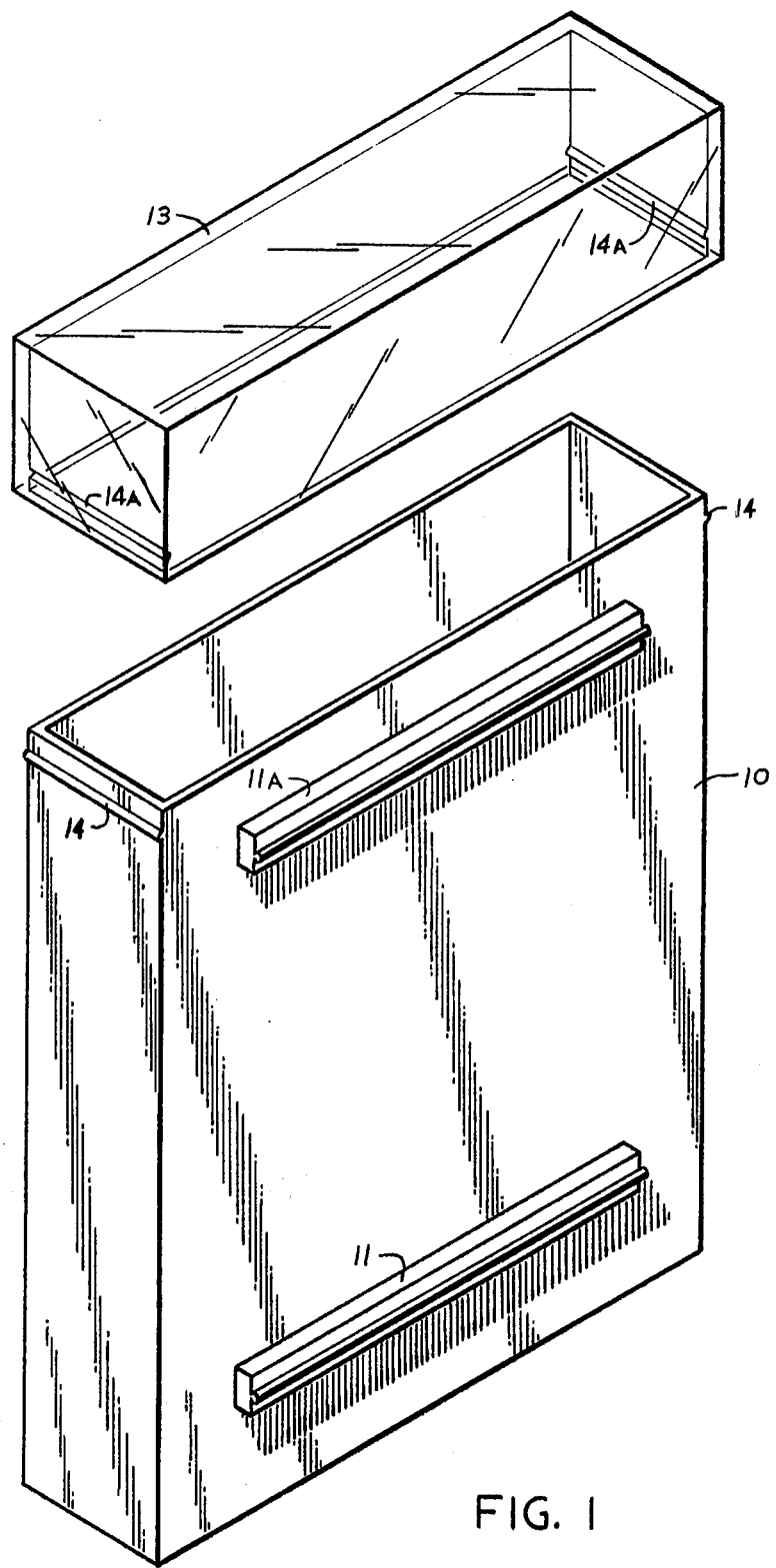
FIG. 1 is an exploded isometric of the container and lid.
Figure 4:
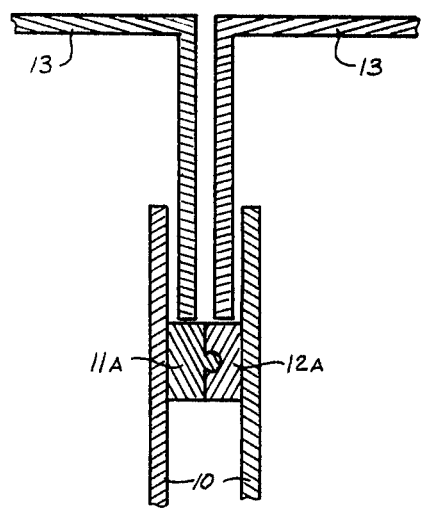
FIG. 4 is a detail of the connecting means.
Figure 5:
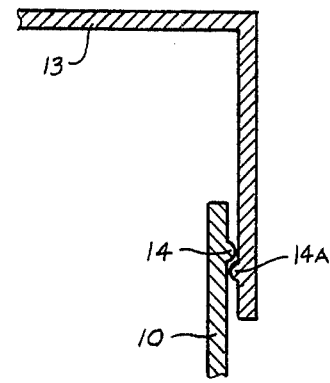
FIG. 5 is a face view of the container depicting the protective lid.
Figure 2:
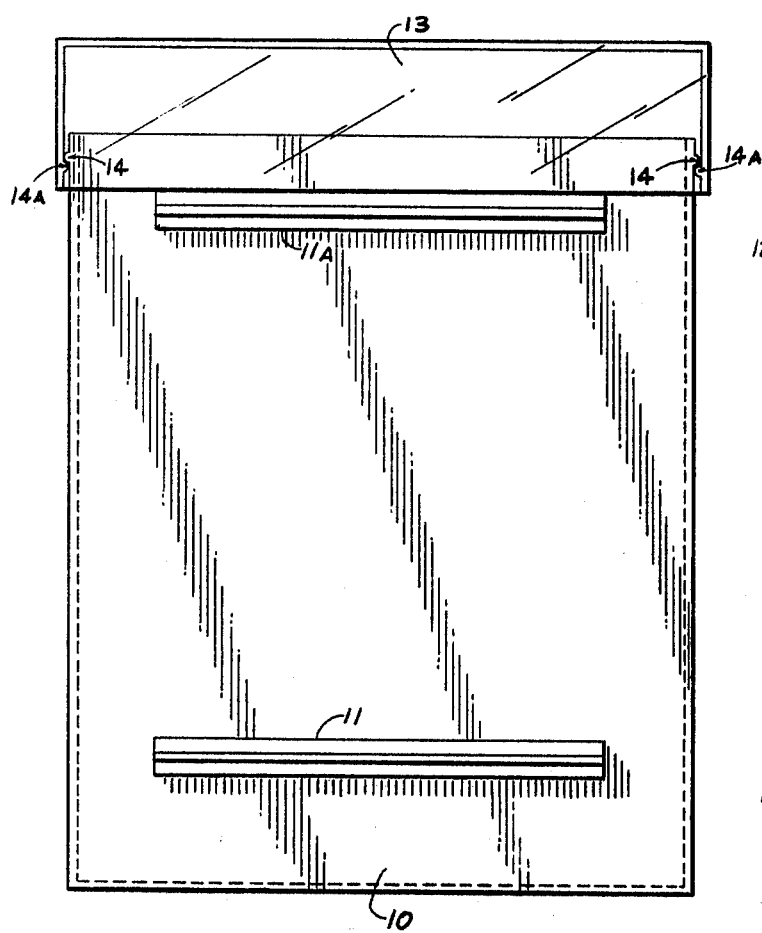
FIG. 2 is a face view of the modular container.
Figure 3:
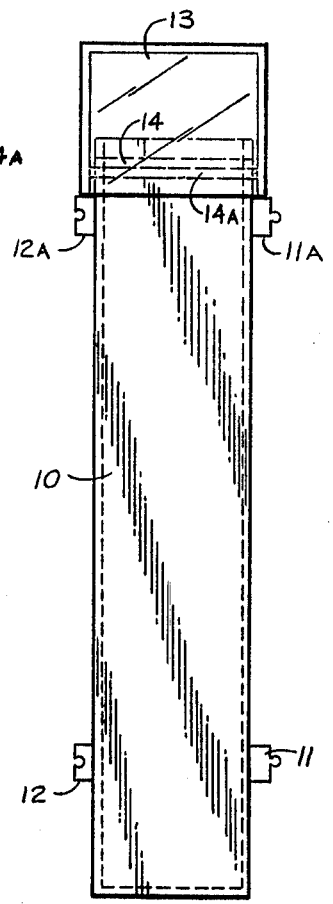
FIG. 3 is a side view of the modular container.

A modular container with 10 dimensioned to contain an eight-track tape cartridge, having on one face an upper connecting member 11A and a lower connecting member 11 performing the male function of a slidable connection completed by the upper connecting member 12A and a lower connecting member 12 performing the female function. Each modular container 10 wields the upper connecting members 11A and 12A on opposing faces and the lower connecting members 11 and 12 also on opposing faces as shown in FIG. 3. Each side wields a semi-cylindrical projection 14 which provides the opposition to 14A thus securing the clear plastic protective lid 13 which rests a top 11A and 12A and composes a secure system for visable covered storage and display of eight-track tapes (see sheet 3 of 10). By matching 11A and 11 of one modular container 10 to 12A and 12 of another modular container 10, the system can be adaptable to the stacking, storage, and transportation of several modular containers 10 (FIG. 4).

To become transportable, carrying units 15 and 19 are attached into the center of an assemblage of modular containers 10 by the utilization of the same slidable connection system employed by each modular container 10.

The simple handle carrying unit 15 is comprised of a single piece of molded material, with a simple handle which provides a permanently exposed grip 16; an upper connecting member 17A and a lower connecting member 17 performing the male function identical to upper bar 11A and lower bar 11 on the modular container 10, and an upper bar 18A and a lower bar 18 on the opposing face of 15 performing the female function identical to upper bar 12A and lower bar 12 on modular container 10. By sliding 11A into 18A; 11 into 18; 12A into 17A; 12 into 17, as in FIG. 10, the assemblage can be transported. The assemblage may be expanded as desired to carry additional tapes by the user.

The retractable handle carrying unit 19 (see FIG. 11) is comprised of a metal bar grip 20 and a molded unit 19. The handle 20 may be lowered to lie in substantially the same plane as the top of the protective lids 13 (see FIG. 12) resting in a groove 23 and sliding within slot 25. 24 stops further extension of grip 20 (see FIG. 11). A finger slot 26 is provided for access to grip 20 (see FIG. 11). The slidable connection of the carrying unit 19 is identical to carrying unit 15 with 21A identical to 17A; 21 identical to 17; 22A identical to 18A; and 22 identical to 18. The assemblage of the unit is identical to the assemblage utilized by the simple handle carrying unit 15. (FIG. 13).

For storage modular container 10 can be arranged on a carrousel system (FIG. 14) comprised of a square platform 27 secured to a circular base of such construction as to incorporate the use of ball bearings. The top of the platform 27 employs the male sections 28 and 28A of the typical slidable connection for the securing of the modular containers. Vertical shafts 31 and 31A are hexagonal in shape and come in two interchangeable lengths of which one end is inserted into a hexagonal shaped hole 29 and secured with a screw 32 from the underside of base 27. The opposite end of 31 is inserted into the hexagonal shaped hole 30 in the handle 33 and secured with a screw 32 from the topside of the handle 33. The modular containers 10 are attached in similar fashion as the carrying units with 28 sliding into 12 and 28A sliding into 12A. The assemblage of interlocked modular containers 10 may then be stacked with the carrousel system 27 allowing for easy viewing and convenient display.

Modular containers 10 may also be stacked for storage and easy viewing in vertical columns to greater heights by using the stabilizer strap 34 comprised of the same slidable connection as to match the connection typical of this invention, with 35 acting as the male connector and 36 acting as the female connector (see FIG. 18). By attaching stabilizer straps to the stacks of modular containers 10 at various elevations, the modular containers 10 may be stacked to any height (see FIG. 17). The use of the stabilizer straps 34 allows for the removal of a tape from any container 10 without the hazard of other containers 10 falling from a shelf.

I claim:

1. A modular container system for visible storage and display of tape cartridges comprising:
   (a) closeable container means having a front face, rear face, opposite side edges and a bottom wall, said container means having an open top end for reception of tape cartridges;
   (b) closure means separate from said connecting means and adapted for engagement on the exterior surface surrounding said container at the open top end thereof for closing said container and protecting the contained cartridges;
   (c) connecting means disposed on the exterior of said front and rear faces and externally of said closeable container for connecting multiple containers in stacked flat face-to-face relationship, said connecting means including:
      (i) an elongate male connector member on one said face having a tongue section;
      (ii) an elongate female member on the other of said face having a groove therein to receive said male member; said male and female connector members' being dimensioned for slideable engagement for securing adjacent closed containers in interlocking uniformally spaced-apart engagement to accommodate said closure means between said front and rear faces.

2. The container system of claim 1 further including carrying means having a frame and a handle, said frame including connecting means disposed on at least one side of said frame for connecting containers at the side of said frame.

3. The modular container system of claim 2 wherein said handle means is retractable within said frame.

4. The modular container system of claim 1 further including a base member having a platform with connecting means thereon whereby said containers can be stacked in vertical orientation on said platform.

5. The modular container system of claim 4 in which said base includes a carousel adapted for rotation.

6. The modular container system of claim 5 further including stabilizing means for inter-engaging adjacent vertical stacks of said containers in a secure relationship.

* * * * *